(12) United States Patent
During et al.

(10) Patent No.: US 10,342,179 B2
(45) Date of Patent: Jul. 9, 2019

(54) MATERIAL CONVEYANCE SYSTEM IN A COMBINE HARVESTER

(71) Applicant: AGCO International GmbH, Neuhausen (CH)

(72) Inventors: Kenneth During, Randers (DK); Morten Leth Bilde, Langaa (DK); David Marden, Kenilworth (GB)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/567,341

(22) PCT Filed: Apr. 7, 2016

(86) PCT No.: PCT/EP2016/057665
§ 371 (c)(1),
(2) Date: Oct. 17, 2017

(87) PCT Pub. No.: WO2016/166016
PCT Pub. Date: Oct. 20, 2016

(65) Prior Publication Data
US 2018/0110184 A1    Apr. 26, 2018

(30) Foreign Application Priority Data
Apr. 17, 2015   (GB) .................................. 1506557.6

(51) Int. Cl.
*A01F 12/44* (2006.01)
*A01F 7/06* (2006.01)
(Continued)

(52) U.S. Cl.
CPC ............ *A01F 12/446* (2013.01); *A01F 7/067* (2013.01); *A01F 12/44* (2013.01); *A01F 12/46* (2013.01); *A01F 12/56* (2013.01)

(58) Field of Classification Search
CPC ........ A01F 12/446; A01F 12/56; A01F 12/46; A01F 7/067; A01F 12/44; A01D 75/282; Y10S 460/901
See application file for complete search history.

(56) References Cited

U.S. PATENT DOCUMENTS

| 790,704 A | 5/1905 | Osborne |
|---|---|---|
| 2,715,963 A | 8/1955 | Brown |

(Continued)

FOREIGN PATENT DOCUMENTS

| CN | 201303517 Y | 9/2009 |
|---|---|---|
| EP | 0850556 A1 | 7/1998 |

(Continued)

OTHER PUBLICATIONS

European Patent Office, International Search Report for parent International Application No. PCT/EP2016/057665, dated Jun. 9, 2016.

(Continued)

*Primary Examiner* — Arpad Fabian-Kovacs

(57) ABSTRACT

A combine harvester is provided with a conveyance system for transporting crop material discharged by overhead grain separating apparatus to a grain cleaning shoe. The conveyance system includes a series of oscillating pans which move the grain in a generally longitudinal direction. A return pan conveys the collected material forwardly to a front discharge edge from where the material falls onto a stratification pan below. The stratification pan conveys the collected material rearwardly to a rear discharge edge from where the material falls into the grain cleaning shoe. At least one of the return pan and the stratification pan is non-rectangular and has a non-transverse discharge edge.

15 Claims, 10 Drawing Sheets

(51) Int. Cl.
*A01F 12/46* (2006.01)
*A01F 12/56* (2006.01)

(56) References Cited

U.S. PATENT DOCUMENTS

| | | | | |
|---|---|---|---|---|
| 2,739,597 | A * | 3/1956 | Buttars | A01D 75/282 209/274 |
| 2,923,409 | A * | 2/1960 | Yonash | A01F 12/446 209/274 |
| 4,018,232 | A * | 4/1977 | Rowland-Hill | A01F 7/06 460/84 |
| 4,561,972 | A * | 12/1985 | Alm | A01D 75/282 209/254 |
| 4,875,889 | A * | 10/1989 | Hagerer | A01D 75/282 460/1 |
| 5,791,986 | A * | 8/1998 | Underwood | A01F 12/44 460/101 |
| 6,056,639 | A * | 5/2000 | Gryspeerdt | A01F 12/44 460/101 |
| 2006/0229119 | A1 * | 10/2006 | Wamhof | A01D 75/282 460/101 |
| 2007/0123326 | A1 * | 5/2007 | MacKin | A01D 75/282 460/101 |
| 2015/0087364 | A1 * | 3/2015 | Adamson | A01F 12/446 460/79 |
| 2017/0325408 | A1 * | 11/2017 | Bilde | A01F 12/44 |
| 2017/0332554 | A1 * | 11/2017 | Bilde | A01F 12/44 |

FOREIGN PATENT DOCUMENTS

| | | |
|---|---|---|
| EP | 2156727 A2 | 2/2010 |
| GB | 1270225 A | 4/1972 |
| GB | 1518069 A | 7/1978 |
| GB | 2328601 A | 3/1999 |
| GB | 2487196 A | 7/2012 |
| JP | 2007074984 A | 3/2007 |

OTHER PUBLICATIONS

UK Intellectual Property Office, International Search Report for Priority UK Application No. GB1506557.6 dated Sep. 17, 2015.

* cited by examiner

MATERIAL CONVEYANCE SYSTEM IN A COMBINE HARVESTER

BACKGROUND OF THE INVENTION

Field of Invention

The invention relates to combine harvesters and particularly to material conveyance systems employed by such to move crop material separated by grain separating apparatus to a grain cleaning shoe.

Description of Related Art

Self-propelled combine harvesters have been used by farmers since the early twentieth century to harvest grain crops from fields. Since then the basic architecture of the crop processing system employed has not changed significantly and is well known.

FIG. 1 illustrates in schematic form the main components of the crop processing system of a combine harvester 10 and will be used to explain the flow of material below. The crop processing system is shown in solid lines whilst the outline profile of harvester 10 is shown in ghost form. It should be appreciated that the details of combine 10 described below are by way of example only and the following description thereof serves only, at this stage, to provide background on the general operating principals of a combine harvester.

Combine harvester 10, hereinafter referred to as 'combine', includes a frame 12 supported on front wheels 14 and rear steerable wheels 16 which engage the ground 101. A driver's cab 18 is also supported on the frame 12 and houses a driver's station from where a driver controls the combine 10.

A cutting header 20 is detachably supported on the front of a feederhouse 22 which is pivotable about a transverse axis x to lift and lower the header 20 in a conventional manner.

The combine 10 is driven in a forward direction (arrow F) across a field of standing crop 102 in a known manner. The header 20 serves to cut and gather the standing crop material before conveying such as a crop material stream into feederhouse 22. An elevator 24, normally in the form of a chain and slat elevator as shown, is housed within the feederhouse 22 and serves to convey the crop material stream upwardly and rearwardly from the header 20 to the crop processor designated generally at 26. At this stage the crop material stream is unprocessed.

The crop processor 26 of the illustrated combine 10 includes a pair of axial flow threshing and separating rotors 28 fed by a tangential flow, crop material impelling, feed beater 30.

The feed beater 30 rotates on a transverse axis and comprises crop engaging vanes (not shown) which convey the crop material stream under the beater and into rotor housings 32 which each house one of said rotors 28. It should be appreciated that only the left-hand rotor 28 and housing 32 is shown in FIG. 1 whereas the right-hand equivalent is hidden from view.

The rotors 28 are positioned to have a generally longitudinal, or fore and aft, rotation axis which is normally inclined upwardly towards the rear of the combine 10.

Flighting elements (not shown) provided on the front end of each rotor 28 engage the crop material stream which is then conveyed as a ribbon or mat 103 in a generally rearward axial and helical path in the space between the rotor 28 and the rotor housing 32.

Axial flow rotors 20 serve to thresh the crop stream in a front region, separate the grain therefrom in a rear region, and eject the straw residue through an outlet 34 in the housing 32 at the rear of the machine either directly onto the ground in a windrow 104 as shown, or via a straw chopper (not shown).

A part-cylindrical grate 36 provided in the underside of each rotor housing 32 allows the separated material to fall by gravity onto either a return pan 38 located below a rear section of the processor 26, or directly onto a stratification pan 40 located below a front section of the processor 26. In reality the separated material falling through the grate 36 is typically a mix of grain and material other than grain (MOG) which may include chaff, tailings and some straw.

The twin rotor axial flow processor 26 shown is one example of known crop processors employed in combines today. Other known, and well established, types of crop processors include single rotor axial flow processors, tangential flow/straw walker (or conventional) processors, and hybrid processors.

The return pan 38 and stratification pan 40 together serve as a material conveyance system arranged to convey the separated crop material to a grain cleaning shoe designated generally at 42. The pans 38,40 each include a respective linkage (not shown) to convert a torque source into oscillating motion to oscillate the pans in a generally fore and aft direction. Combined with a transversely rippled or corrugated floor, the oscillating movement of the return pan 38 and stratification pan 40 propels the material generally forwardly or rearwardly respectively.

The return pan 38 "returns" the separated material incident thereon towards the front of the combine 10 (in the direction F) to a front discharge edge from which the material falls or cascades onto the stratification pan 40. The material on the stratification pan 40 is conveyed rearwardly to a rear discharge edge 46 from where the material falls into the cleaning shoe 42.

The grain-MOG mixture conveyed by the stratification pan 40 "stratifies" over the course of conveyance wherein the heavier grain works its way into a bottom grain-rich layer and the lighter MOG works its way into a top MOG-rich layer. This pre-stratification effect upstream of the cleaning shoe has been found to be beneficial to the overall cleaning process and the capacity of the shoe. Moreover, extending the return pan 44 forwardly to present a significant overlap with the stratification pan 40 (even more so than shown) has been found to enhance the stratification of the total grain-MOG mix. The effects and advantages of pre-stratification of the grain-MOG mix is disclosed in WO-2012/095239, the contents of which is incorporated herein by reference.

The pre-stratified grain-MOG mix falls from the rear discharge edge 46 into the cleaning shoe 42 where the cascading mix is subjected to a cleaning airstream generated by fan 48, before falling onto the front of upper sieve or chaffer 50.

Chaffer 50 comprises adjustable louvres supported on a frame which is driven in fore-and-aft oscillating manner. The material which settles on the chaffer 50 is conveyed in a generally rearward direction and the heavier smaller grain-rich material passes between the louvres onto an underlying lower sieve 52, whereas the lighter larger material passes to the end of the chaffer and out of the rear of the machine at 54. A rear section of chaffer 50a is commonly independently adjustable and is configurable to allow un-threshed tailings to pass therethrough into a re-threshing region 56 from where the tailings are conveyed via a re-threshing auger 58 back to the processor 26.

Lower sieve 52 is also driven in an oscillating manner to convey the collected grain-MOG mix rearwardly wherein the material falling therethrough is collected by a clean grain auger 60 for conveyance to an elevator (not shown) for onward conveyance to a grain tank 62. Material which does not pass through lower sieve 52 and is instead conveyed off the rear edge thereof falls into re-threshing region 56 for subsequent re-threshing.

The airstream generated by fan unit 48 is also conveyed by ducting up through lower sieve 52 and chaffer 50 to encourage lifting of the MOG from the chaffer surface.

For completeness the combine 10 includes an unloading system which includes an unloading auger 64.

Ever since the introduction of the self-propelled combine harvester and the well-known crop processing architecture embodied therein, the trend has been for machines having greater capacity with time. Upsizing of the various constituent systems has been the obvious route to increasing capacity such as wider cutting headers, wider cleaning shoes and higher capacity grain tanks. However, today high-capacity machines are up against the size limit in terms of maximum width and height imposed by highways legislation. Manufacturers are, therefore, faced with the challenge of increasing capacity without breaching the existing spatial machine envelope.

One bottleneck in the drive for increased capacity in the crop processing architecture today is the limitations presented by the material conveyance system between the processor and the cleaning shoe. Any further increase in throughput without an increase in total machine height and/or width will lead to a significantly raised occurrence rate of blockage simply due to the finite space available between the overlapping material conveyance pans.

SUMMARY OF THE INVENTION

In accordance with the present invention there is provided a non-rectangular crop material conveyance pan for a combine harvester. The conveyance pan may be, for example, a return pan, a stratification pan or a cascade pan for use in a combine harvester conveyance system.

Reference to the shape of the crop material conveyance pan is made in relation to the profile of the major surface or pan floor when viewed from above. Conventional crop material conveyance pans in combines are rectangular with two long parallel sides and two shorter parallel sides, one of which forms a material discharge edge. A non-rectangular conveyance pan in accordance with the invention provides a longer effective discharge edge thereby spreading out the material and reducing the risk of blockage.

The crop material conveyance pan may comprise three edges with a material retaining lip or profile and a crop discharge edge which has at least a portion which is non-orthogonal with respect to the adjacent sides. Preferably the pan comprises a pair of opposite parallel sides for alignment with the sides of the internal profile of a combine. In a simple embodiment, the crop material conveyance pan is trapezium-shaped (European definition of trapezium) with one pair of parallel sides and one pair of non-parallel sides.

A combine harvester in accordance with an embodiment of the invention comprises the crop material conveyance pan which, by way of example, may be a return pan or a stratification pan in a crop material conveyance system for transferring crop material separated by grain separating apparatus to a grain cleaning device or "shoe".

A combine harvester embodying the invention shall have a normal forward direction of travel which defines a longitudinal direction and a transverse direction for the purposes of defining further embodiments of the invention. It should be understood that the transverse direction is perpendicular to the longitudinal direction, wherein a transverse axis extends horizontally from left to right of the combine harvester.

When installed in a combine harvester, the crop material conveyance pan is coupled to a drive mechanism which is operable to drive the pan in an oscillating or reciprocating manner, wherein the pan is positioned in the combine harvester so that the discharge edge is disposed at a non-zero angle to a transverse vertical plane.

Advantageously, by angling the discharge edge with respect to the transverse direction, a longer discharge edge can be accommodated without having to increase the width of the pan nor the width of the envelope which houses such. It shall be appreciated that the crop material transported by the conveyance pan is deposited by the discharge edge in a line which is spread longitudinally, rather than in a straight transverse line across the width of the pan. Such longitudinal spreading of the deposited material delivers beneficial effects which will be described in more detail below in relation to preferred embodiments.

In one embodiment the discharge edge of the crop material conveyance pan extends from a first side edge to a second opposite side edge. The discharge edge may be straight or curved or include both straight and curved portions. The discharge edge is longer than the transverse width of the pan as defined by the normal forward direction of the combine.

In some preferred embodiments said crop conveyance pan is a return pan positioned under the grain separating apparatus, the return pan serving to catch crop material separated by such and convey the collected material in a generally forward direction to the discharge edge.

It is recognised that the spacing between the discharge edge of a return pan and the surface below onto which the conveyed material is deposited is finite. Furthermore, the scope to increase this spacing is limited by the aforementioned restrictions on total machine height. As mentioned above, this finite window for the crop material to pass through presents an increased risk of blockage in association with any increase in throughput. By angling the discharge edge of the return pan with respect to the conventional transverse direction, the passage available for the window is increased thus reducing the risk of blockage and easing the restrictions on increasing material throughput.

The combine harvester may further comprise an oscillating grain pan, hereinafter referred to as a "stratification pan", positioned to catch crop material falling from the discharge edge of the return pan, and convey the crop material rearwardly to a grain cleaning shoe. The discharge edge of the return pan preferably resides entirely over the stratification pan so that all of the grain-MOG mix caught by the return pan has an opportunity to stratify on the stratification pan before being presented to the cleaning shoe.

The return pan and/or the stratification pan preferably comprises a corrugated or 'rippled' floor with a saw-tooth profile to assist in conveyance of the crop material in conjunction with the oscillating motion. Moreover, the return pan and/or the stratification pan may be inclined longitudinally so as to offer a general incline or decline in the longitudinal direction. Such an angle is selected depending on the architecture of the harvester and the available space, as well as the desired crop conveyance rate.

It should be understood that a crop material conveyance pan in accordance with the invention will be preferably unperforated and comprise a major upward-facing surface or "floor" over which the crop material is conveyed. References made herein to the angle or incline of the crop conveyance pan in accordance with the invention are made in relation to the angle of the material conveying floor thereof.

In a first set of preferred embodiments having a return pan with a non-transverse edge, a transverse vertical section of the return pan is horizontal. It is understood that the return pan may be sloped in the longitudinal direction, typically downhill in the general forward direction of material conveyance, as is common in combines today. In this first set of preferred embodiments at least one transverse section taken through the return pan is horizontal. In other words, material resting upon the return pan floor (with the combine on flat ground), naturally flows, aided by gravity and the oscillating motion, in a direction that is longitudinally forward but with a negligible transverse component. Such a return pan is preferably planar over a majority of the floor surface, albeit with a rippled floor profile.

The profile of the discharge edge of the return pan in accordance with preferred embodiments of the invention is dependent upon the type and layout of the grain separating apparatus disposed above. The invention involves the recognition that the profile of the grain-MOG discharged from the separating apparatus, and collected by the stratification and return pans, is far from uniform often leading to a significantly uneven width-wise distribution of the material both in terms of the grain-MOG ratio and the volume of material. A suboptimal distribution of the grain and MOG on the stratification pan can result in reduced pre-stratification whilst an imbalance in material volume across the width of the stratification pan is known to result in poor cleaning efficiency.

In one simple embodiment of the invention, the grain separating apparatus comprises an axial-flow crop processing rotor having a rotation axis which is aligned fore and aft, the rotor having a downturning side and an upturning side, and wherein the discharge edge comprises a forward edge zone and a rearward edge zone disposed rearward of the forward edge zone, and wherein the forward edge zone resides below the downturning side of the rotor, and wherein the rearward edge zone resides below the upturning side of the rotor.

It has been observed that such an axial-flow processor tends to deposit a higher proportion of separated material on the downturning side than on the upturning side thus leading to a lateral imbalance of material caught by the return pan and the stratification pan. Moreover, the material discharged on the downturning side is more grain-rich by volume whereas material discharged on the upturning side is more MOG-rich by volume.

By providing a forward, or leading, edge zone laterally corresponding with the downturning side of the rotor above, the grain-rich material, and the majority of the grain, collected by the return pan is deposited onto the stratification pan at a position that is more forward than the discharge location of the MOG-rich material collected by the return pan, albeit laterally offset. Advantageously, a greater proportion of the grain caught by the return pan is carried to the front of the stratification pan thus giving the grain and longer transit path on the stratification pan thus enhancing pre-stratification whilst also benefitting from the discharge edge of increased length.

The above-described embodiment with a planar, non-laterally sloping, return pan can be adapted to cater for a twin axial-flow crop processor. In such an arrangement, the grain separating apparatus comprises a pair of axial-flow crop processing rotors having respective rotation axes which are aligned fore and aft and mutually side-by-side, and wherein each rotor has a downturning side and an upturning side, wherein the rotors are driven to rotate in opposite directions defining transversely inner upturning sides and outer downturning sides, and wherein the discharge edge comprises a central rearward edge zone and forward edge zones disposed forwardly, and to each side of, the rearward edge zone, and wherein each forward edge zone resides below the downturning side of one of the rotors, and wherein the rearward edge zone resides below both upturning sides.

By way of example, the discharge edge may be curved from one side to the other in a generally concave fashion or straight with a V-shaped profile. Again, the higher proportion of grain falling from the downturning side of the two rotors is carried further forward for deposition onto the stratification pan than the material falling from the upturning sides.

In an alternative arrangement in which the direction of rotation of the rotors is the reverse of that described above (downturning on the inside), the discharge edge comprises a central forward edge with an adjacent pair of rearward edges.

Enhanced pre-stratification can be achieved with the provision of a dual return pan arrangement in which first and second oscillating return pans are positioned under the grain separating apparatus, longitudinally offset from one another and each serving to catch crop material separated by such and convey the collected material in a generally forward direction to a respective discharge edge. This arrangement, per se, is described in International patent application publication WO-2015/062965. In short, the dual return pan arrangement exploits the uneven longitudinal grain-MOG distribution profile falling from separating apparatus to deposit a high-proportion of the grain-rich material onto the front of the stratification pan with a front return pan, whilst the MOG-rich material from the rear of the separating apparatus is delivered to the rear of the stratification pan (on top of the grain) by a rear return pan.

The present invention can be applied in conjunction with such a dual return pan arrangement wherein at least one of the return pans comprises a non-transverse discharge edge. In such an arrangement with planar return pans.

Advantageously, the above-described embodiments of the invention are simple to implement in today's combines by small changes in the design of the return pans. For example, one need only adapt the profile of the discharge edge to extend the effective length of such and derive some of the aforementioned benefits.

It is recognised that the above-described simple embodiments do not assist significantly in the lateral balancing of the grain-MOG material collected by the return pan. In a second set of preferred embodiments the return pan comprises a transversely, or laterally, inclined floor portion in combination with a non-transverse discharge edge.

The return pan preferably comprises a contoured floor portion which guides crop material sideways under gravity to a trough, wherein the discharge edge comprises a forward edge zone and a rearward edge zone disposed rearward of the forward edge zone, and wherein the trough guides crop material to the forward edge zone. By providing a laterally sloping floor portion the material collected on parts of the return pan can be steered laterally. In conjunction with the non-transverse discharge edge, this material can be deposited on the stratification pan for optimal pre-stratification and for optimal width-wise loading of the shoe.

This aspect of the invention further involves the recognition that the grain-MOG mix conveyed on the return pan stratifies to some extent over its transit. By laterally shifting the material on the return pan the transit path is increased thus increasing the stratification. Moreover, the troughs defined by the sloping floor portions enhance such stratification as the heavier grain sinks to the bottom of the troughs whilst the lighter MOG works to the top of the material mat. When the stratified mat reaches the front of the return pan, the transversely angled discharge edge serves to carry the bottom layer of grain further forward onto the stratification pan than the layer of MOG sitting on top. As shall be appreciated, this enhances pre-stratification immediately upstream of the cleaning shoe.

As with the first set of embodiments, the chosen profile of the non-transverse discharge edge is dependent upon the type and arrangement of the grain separating apparatus disposed above. Moreover, the contour profile of the laterally sloping floor portions and troughs is also dependent upon the type and arrangement of the grain separating apparatus disposed above.

A return pan having a laterally sloping floor portion in conjunction with a non-transverse discharge edge can be employed in combines having various different types of separating apparatus, and for single or dual return pan configurations.

By way of example, a combine having grain separating apparatus comprising a single axial-flow rotor, preferably has a return pan wherein the forward edge zone resides below the upturning side of the rotor, and wherein the rearward edge zone resides below the downturning side of the rotor. The laterally inclined floor portion of the return pan serves to guide the grain-MOG material collected under the downturning side toward the upturning side and deposit this material toward the front of the stratification pan. Whilst passing over the return pan, the grain and MOG stratify so that the upper MOG-rich material falls from the return pan at a position further back compared to the lower grain-rich material.

Furthermore, the lateral incline is exploited to laterally redistribute the high volume of material falling from the downturning side of the rotor. The rearward positioning of the discharge edge on the downturning side in this arrangement, advantageously allows the grain-rich material falling from the front of the separating apparatus to fall directly onto the stratification pan.

It shall be appreciated that the profile of the discharge edge with respect to the upturning and downturning sides of the rotor in this arrangement is in contrast to that for the equivalent planar return pan described above. This is because the laterally sloping floor portion of the return pan facilitates lateral redistribution of the collected material whereas a planar pan with no lateral incline does not.

The above-described embodiment can be adapted to cater for a twin axial-flow crop processor. In such, the contoured floor portion slopes away transversely from a catchment portion disposed below the downturning side of each rotor defining at least one trough below the upturning side of each rotor. In the case of both rotors upturning toward the centre of the combine, the return pan floor preferably comprises a central longitudinal trough so that material collected under the respective downturning (outer) sides is steered laterally toward the centre vertically stratifying all the while. In such an arrangement, the discharge edge preferably comprises a rearward edge zone on both sides of a central forward edge zone so as to allow the material falling from the downturning sides at the front of the separating apparatus to fall directly onto the stratification pan thus laterally balancing the width-wise material distribution.

In a further embodiment of the invention, the combine comprises a dual return pan configuration wherein at least one of the return pans comprises a transversely inclined floor portion and a non-transverse discharge edge. Preferably, both the first and second return pans in such an arrangement comprise a transversely inclined floor portion and a non-transverse discharge edge.

When a dual return pan arrangement is employed under separating apparatus having a single axial-flow rotor, a floor portion of the front return pan preferably slopes laterally downwardly to the downturning side of the rotor, and a floor portion of the second return pan slopes transversely downwardly to the upturning side of the rotor.

When a dual return pan arrangement is employed under separating apparatus having a twin axial-flow rotor setup, the front return pan preferably comprises sloping floor portions which are each inclined laterally and downwardly towards a zone below the upturning side of the rotors, and the second return pan comprises sloping floor portions which are each inclined laterally and downwardly towards a zone below the downturning sides of the rotors. In other words, for a pair of separating rotors which turn upwardly in the middle, the grain-MOG mix caught by the front return pan is guided toward the transverse centre of the combine, whereas the grain-MOG mix caught by the rear return pan is guided outwardly.

The floor of front return pan preferably comprises a central longitudinal trough, and the floor of the second return pan preferably comprises a central longitudinal crest.

Advantageously, a dual return pan arrangement provides improved longitudinal distribution of the grain and MOG on the stratification pan, wherein the contour and discharge edge profiles of the return pans can be adapted to cater for different grain separating apparatus configurations.

The front return pan may have a non-transverse rear edge so as to, advantageously, increase the discharge window for material discharged by the rear return pan thus reducing the risk of blockage. In a preferred arrangement a gap is provided, when viewed from above, between the rear edge of the front return pan and the front edge of the rear return pan, through which grain and MOG can fall directly from the separating apparatus above onto the stratification pan below.

Advantageously, a dual return pan arrangement occupies less height under grain separating apparatus than a single return pan of equivalent length due to the longitudinal (downhill) incline required for adequate conveyance. However, in a combine where height availability is less of an issue then a single return pan in accordance with a preferred embodiment can be employed wherein the floor of the return pan comprises an opening which defines a secondary discharge edge. The secondary discharge edge, offset rearward of the front discharge edge, serves in part a similar function to the discharge edge of a rear return pan in a dual return pan arrangement wherein a portion of the collected material is discharged onto a rear zone of the stratification pan.

The floor is preferably contoured so as to define a material guidance trough configured to guide crop material around the opening. For example, when applied together with twin rotor grain separating apparatus the opening is preferably disposed intermediate a rear floor portion and a front floor portion, wherein the rear floor portion comprises a central longitudinal crest, and wherein the front floor portion comprises a central longitudinal trough.

Advantageously, a single return pan with a secondary, intermediate, discharge edge consists of fewer components than a dual return pan arrangement, albeit at the cost of increased height.

BRIEF DESCRIPTION OF THE DRAWINGS

Further advantages of the invention will become apparent from reading the following description of specific embodiments with reference to the appended drawings in which.

DETAILED DESCRIPTION OF SPECIFIC EMBODIMENTS

Figure 1:
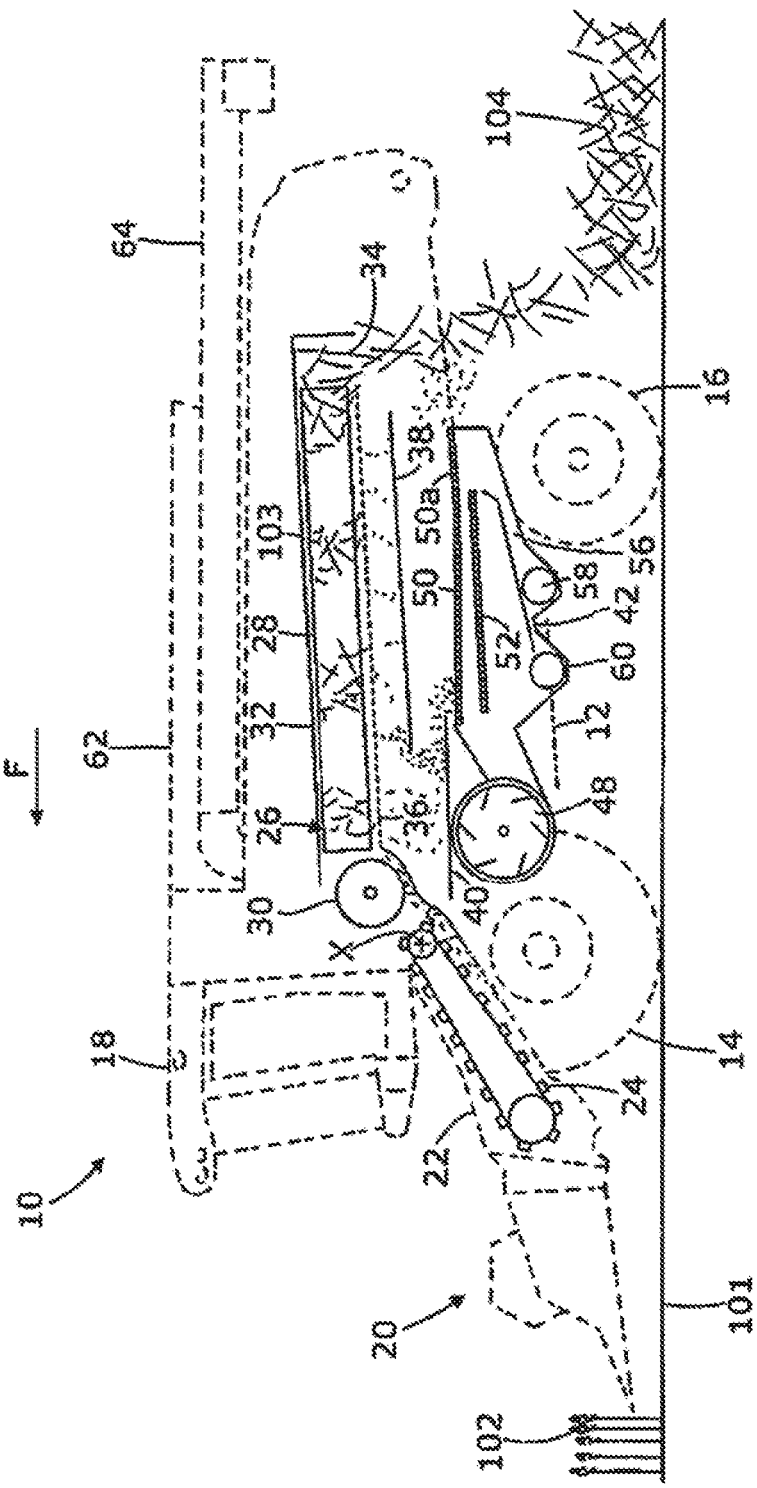
FIG. 1 is a schematic sectional view of a combine harvester having a known crop processing architecture.

The combine harvester depicted in FIG. 1 has been described above in relation to the component architecture and the general crop material flow through the combine. Reference is invited to the description above. Reference numbers used in FIG. 1 for the stratification pan 40, and cleaning shoe will be reused in the following embodiments.

The present invention relates to the material conveyance system disposed below the grain separating apparatus and employed to convey the grain and MOG falling therefrom to the cleaning shoe 42. Although aspects of the invention can be applied to the stratification pan 40, or a cascade pan, the specific embodiments described hereinafter involve application of the present invention to the return pan 44, or a return pan system, for conveying the collected material forwardly in the direction F.

Relative terms such as forward, rearward, transverse, lateral, longitudinal and sideways will be made with reference to the normal forward direction of travel of the combine 10 and indicated by arrow F. The terms vertical and horizontal will be made with reference to the level ground 101 upon which the combine 10 is disposed. In other words the Cartesian axes of 'longitudinal', 'transverse', and 'vertical' are made in relation to the frame 12 of combine 10 and are not affected by any slope in the ground. The terms "upstream" and "downstream" are made with reference of the general direction of crop flow along the material conveyance systems described.

Planar Return Pan

Figure 2:
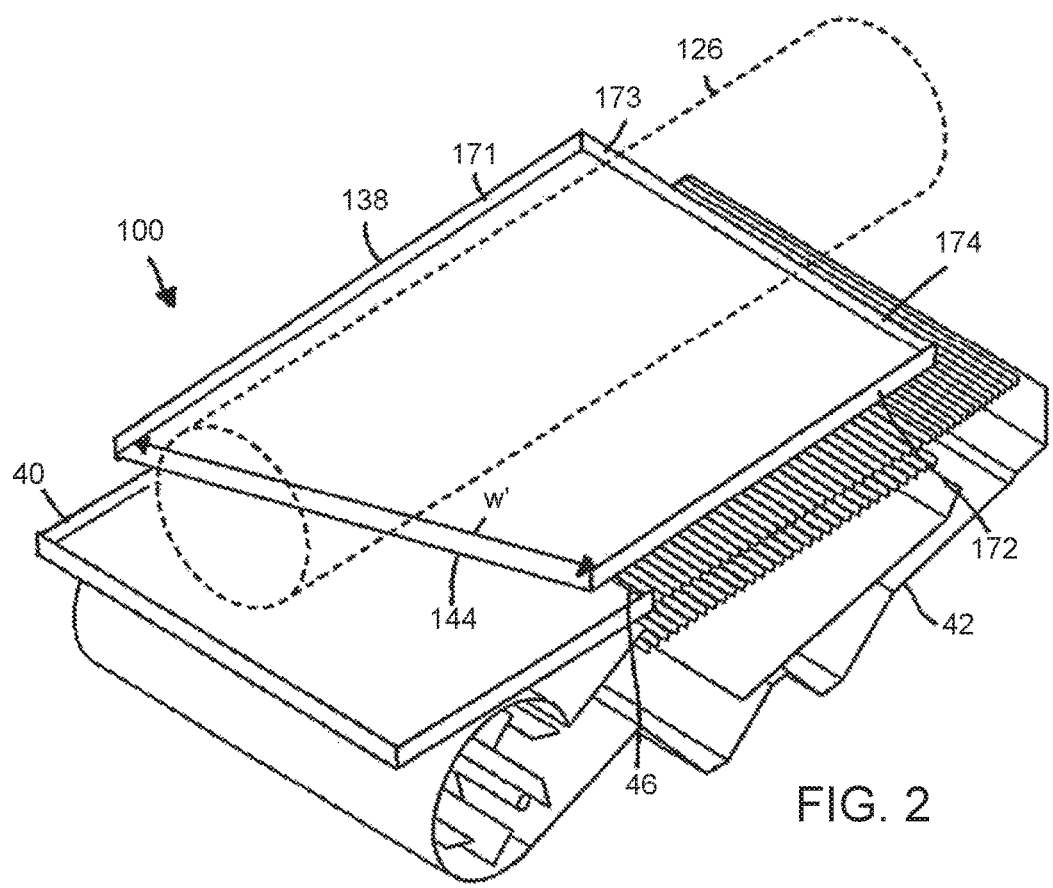
FIG. 2 is a schematic perspective view of a crop material conveyance system in a combine harvester in accordance with a first embodiment of the invention.
Figure 3:
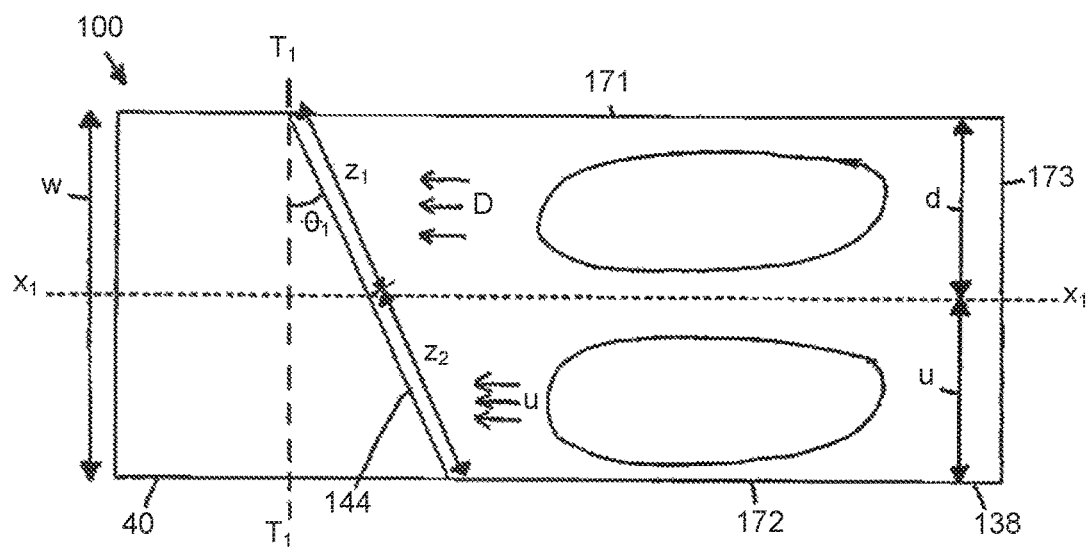
FIGS. 3 and 4 are schematic plan and sections views respectively of the crop material conveyance system of FIG. 2.
Figure 4:
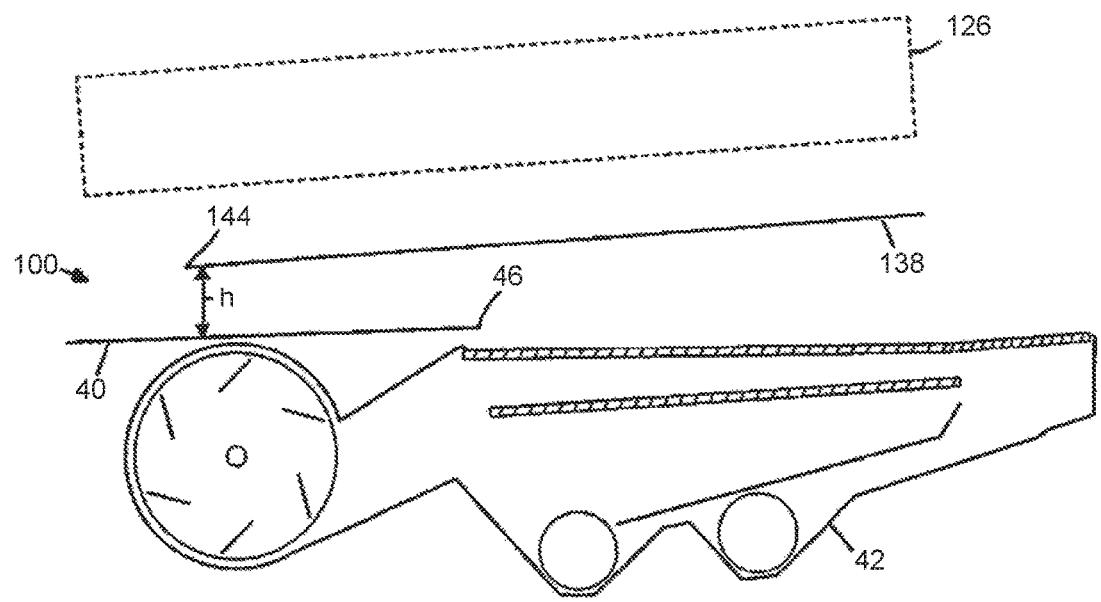

In a first embodiment illustrated in FIGS. 2, 3 and 4, a crop material conveyance system 100 comprises a return pan 138 and a stratification pan 40. It should be understood that the conveyance system 100, and further systems to be described, can replace the return pan 38 and stratification pan 40 of the combine 10 described with reference to FIG. 1.

Both the return pan 138 and stratification pan 40 are coupled to a drive mechanism (not shown) for driving the respective pans in an oscillating manner. The pans 138, 40 are disposed below grain separating apparatus 126 which, in this example, comprises a single axial flow crop processing rotor having a rotation axis X1 which is aligned fore and aft and transversely centred. The grain separating apparatus 126 is represented schematically (in dashed lines) to reveal the underlying conveying system 100.

It should be understood that although referred to as grain "separating" apparatus, the axial flow processing rotors described in the following embodiments may additionally serve a threshing function. For example, a front portion of the processing rotor may comprise threshing elements whereas a rear portion of the rotor comprises separating elements.

As will now be apparent from reading the above description, the material conveyance system 100 serves to collect grain and MOG discharged by the grain separating apparatus 126 and convey the collected material to the cleaning shoe 42. As in known systems the return pan 138 conveys the collected grain and MOG forwardly to a front discharge edge 144 from which the material falls onto the underlying stratification pan 40 which then conveys the material rearwardly to a rear discharge edge 46. As will be apparent from FIG. 4, grain and MOG falling from the front of separating apparatus 126 falls directly onto stratification pan 40.

Return pan 138 is mounted inside the envelope of combine 10 so as to be inclined downwardly towards the front end so as to exploit gravity for forward conveyance of the collected material. As with known return pans, the major, upward facing, surface thereof defines a floor which may include a rippled or corrugated surface profile which assists in conveyance of the material. The return pan 138 is trapezium-shaped having a first long side 171, a second shorter side 172 opposite the first long side 171, a rear edge 173 and a front discharge edge 144 which is aligned at a non-zero angle $\theta_1$ to a hypothetical transverse vertical plane indicated in FIG. 3 by dashed line $T_1$. The two longitudinal sides 171,172 and the rear edge 173 are provided with a material retaining lip 174 whereas the front discharge edge 144 is open to allow material to fall therefrom.

Discharge edge 144 is disposed at an angle $\theta_1$ to the transverse direction or to a transverse vertical plane $T_1$. As a result the effective discharge edge has a length w' which is longer than the width w of pans 40, 138. Although the height h between the discharge edge 144 and the underlying stratification pan 40 remains the same, the increase in length of the effective discharge edge w' increases the window through which material can pass between the pans 40, 138 thus reducing the risk of blockage and/or allowing for increased material throughput.

As has been described above, axial-flow grain separating apparatus discharges a higher volume of material on the downturning side d than the upturning side u, as is the case with single rotor processor 126 illustrated. The transverse angle $\theta_1$ of the discharge edge 144 is such that material incident on downturning side d is carried further forward onto stratification pan 40 than material incident on upturning side u. This is illustrated in FIG. 3. Grain and MOG falling on downturning side d is conveyed generally forwardly as shown by arrows D to a first forward edge zone $z_1$ of discharge edge 144 from where the material falls onto the stratification pan 40. Grain and MOG falling onto upturning side u is conveyed forwardly and longitudinally as indicated by arrows u to a second, rearward, edge zone $z_2$ which is disposed rearward (towards the rear of the combine) than forward edge zone $z_1$.

It is recognised that the high volume of material falling onto downturning side d has a higher grain-to-MOG ratio than the material falling onto upward turning side u. Advantageously, the grain-rich material on the downturning side d is carried further forward onto the stratification pan 40 thereby increasing the transit path thereof and increasing the opportunity for the grain on the stratification pan 40 to settle to the bottom layers before being presented to the cleaning shoe 42. This is in contrast to the more MOG-rich material on the upturning side u which falls from rearward edge zone $z_2$ towards the rear of stratification pan 40 and onto the top of grain already settled thereon having falling directly from the front end of grain separating apparatus 126.

In a second embodiment illustrated in FIGS. 5 and 6, the above-described angled discharge edge is applied to a grain conveyance system 200 disposed below a twin-rotor, axial-flow, grain separating apparatus represented by dashed lines and designated 226. In the embodiment illustrated, and as is common with twin rotor systems, the grain separating rotors rotate in opposite directions as indicated by arrows R wherein the sides adjacent the longitudinal centre line of the combine turn upwardly and the sides nearest the outside of the combine turn downwardly. The rotation axes of rotors 226 are illustrated in FIG. 6 by lines $X_R$ and $X_L$. The rotation directions of the rotors 226 define a central upturning zone u and two outer down turning zones d.

The grain conveyance system 200 comprises a return pan 238 and a stratification pan 40, the latter having the same rectangular profile to that described above.

Focusing on the differences with respect to the first embodiment, the discharge edge 244 comprises a central rearward edge zone $z_3$ and forward edge zones $z_4$, $z_5$ disposed forwardly and to each side of the rearward edge zone $z_3$. It should be understood from FIG. 6 that the rearward edge zone $z_3$ resides below the upturning zone u of processor 226 whereas each forward edge zone $z_4$, $z_5$ resides below the respective downturning zones d. Adopting the same principles as in the first embodiment, the high volume of grain-rich material falling on the downturning sides d is conveyed forwardly to forward edge zones $z_4$, $z_5$ whereas the more MOG-rich material falling on upturning side u is discharged onto the stratification pan 40 further back.

Discharge edge 244 is predominantly curved having a concave-shaped profile when viewed from above. However, it should be understood alternative profiles can be employed whilst still embodying the invention, wherein the edge zone $z_3$ corresponding to the upturning zone u is disposed rearward of the edge zones $z_4$, $z_5$ corresponding to the downturning zone d. It should also be understood that the embodiment of FIGS. 5 and 6 can be adapted for grain separating rotors which turn in different directions to those shown.

It will be appreciated that the effective discharge edge 244 is longer than the width of the pans 40, 238 and, as a result, the risk of blockage is reduced whilst increasing the capacity of higher material throughput.

In a third embodiment (FIGS. 7 and 8) a material conveyance system 300 comprises a dual return pan system and a stratification pan 40. The principle of a dual return pan is described in unpublished International patent application PCT/EP2014/072748 wherein two separate return pans are employed one behind the other, each having respective front discharge edges. A rear return pan 338 is disposed under a rear portion of twin rotor separating apparatus 226 and has a similar construction and floor profile to that of return pan 238 described in the previous embodiment. A second, front, return pan 378 is located in front of the rear return pan 338 and serves to collect grain and MOG from a front portion of the separating apparatus 226.

In short, the dual return pan system exploits the recognition that the majority of the grain discharged by the separating apparatus 226 falls from a front portion. The front return pan 378 collects this high volume of grain rich material and conveys this to a front region of stratification pan 40 whereas the rear return pan 338 collects material richer in MOG and discharges such onto a rear region of the stratification pan. As a result, a higher proportion of the separated grain has an increased transit path on the stratification pan thus increasing the effect of stratification upstream of the cleaning shoe 42. The MOG-rich material discharged from the discharge edge 344 of rear return pan 338 falls onto the grain layers on a rear region of stratification pan 40 thus enhancing the stratification further. Furthermore, the dual return pan system spreads the total volume of material falling from the separating apparatus 226 thus reducing the risk of blockage and increasing potential throughput capacity.

Figure 7:
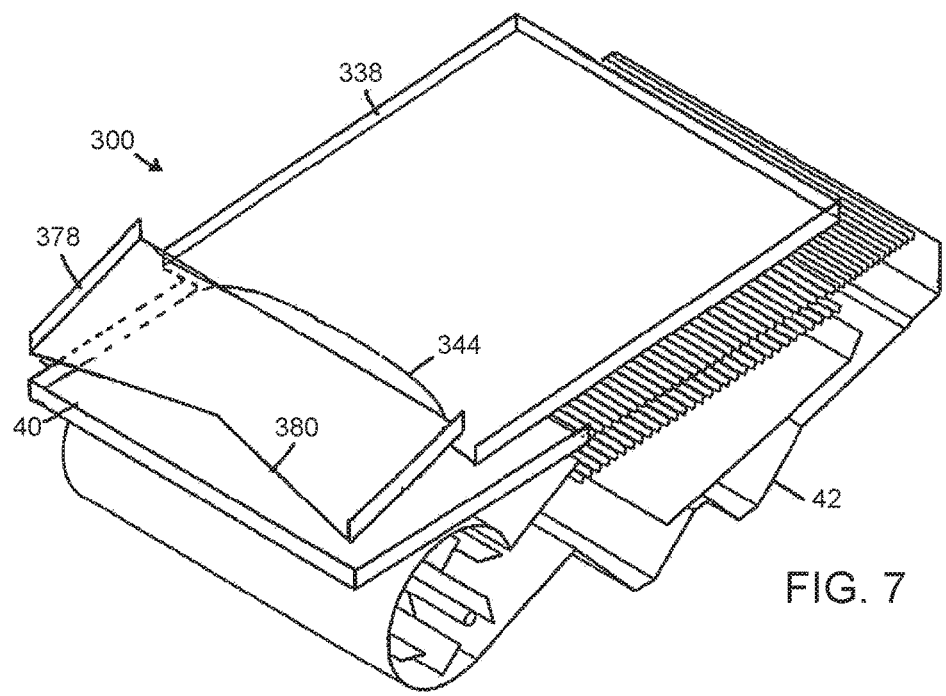
FIG. 7 is a schematic perspective view of a crop material conveyance system in a combine harvester in accordance with a third embodiment of the invention.
Figure 8:
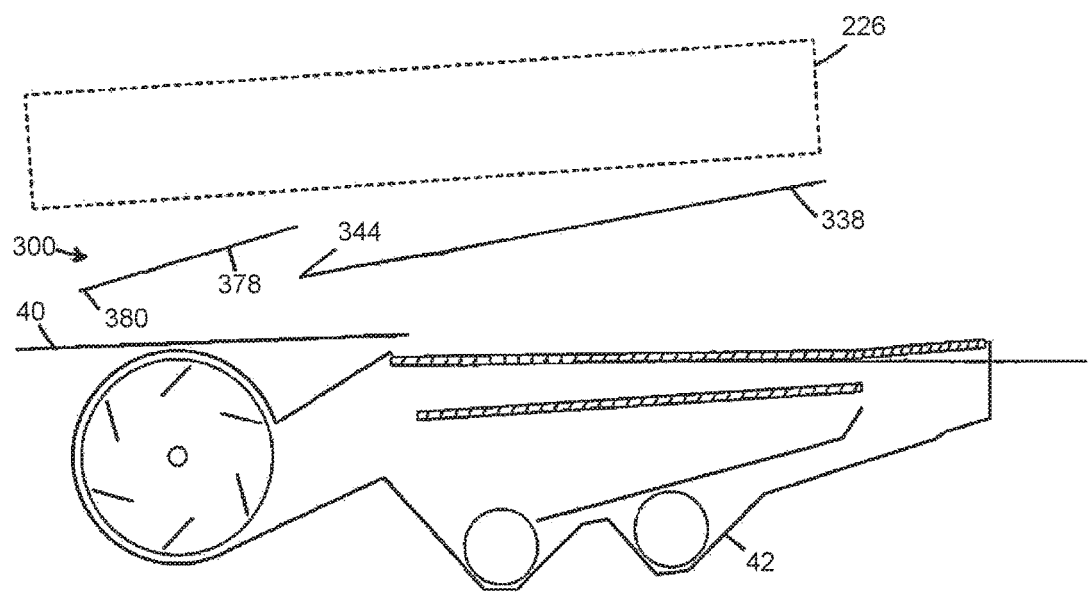
FIG. 8 is a schematic sectional view of the crop material conveyance system of FIG. 7.

As can be seen from FIG. 7, both the front and rear return pans 378, 338 have a respective discharge edge 380, 344 which includes a central rearward edge zone corresponding to the upturning side of separating rotors 226 and forward edge zones located either side of the rearward edge zones. The effective length of each discharge edge 344, 380 is increased as per the above-described embodiments thus reducing the risk of blockage. Furthermore, the grain-rich material falling on the downturning sides of the separating rotors 226 is conveyed further forward onto the stratification pan 40 than the material falling onto the upturning side.

The discharge edge 380 of the front return pan 378 has a substantially V-shaped profile whereas the discharge edge 344 of rear return pan 338 is curved. It should be understood that the profiles of the discharge edges are shown merely by way of example.

In an alternative (not illustrated) embodiment, the rear edge of front return pan 378 may be shaped so as to have a concave-shaped profile which present a larger 'window' to material falling from the front edge 344 of the rear return pan 338, thus reducing the risk of blockage and improving capacity thereof.

The return pan, or pans, of the above-described embodiments each have a substantially planar floor, albeit corrugated for assisting material conveyance. Advantageously, implementation of such return pans, and their associated benefits, into today's combine models is relatively straight-forward and simply requires adaptation of the profile of the leading discharge edge without any requirement to adapt the drive mechanism or substructure of the pan.

Contoured Return Pans

In a further aspect of the invention the return pan may be mounted inside the combine so as to have a transversely inclined floor portion which, with the assistance of gravity, imparts a sideways or lateral force on the conveyed material so as to shift the material sideways as it is conveyed forwardly to the discharge edge. Such action can be exploited to laterally distribute the collected grain and MOG to achieve a more balanced distribution of crop material in terms of volume on the stratification pan and ultimately across the width of the cleaning shoe.

Employed in conjunction with an angled discharge edge as described above, the contoured floor portion preferably guides the crop material sideways to a trough which guides the material to a forward edge zone for reasons which will become apparent below.

Figure 11:
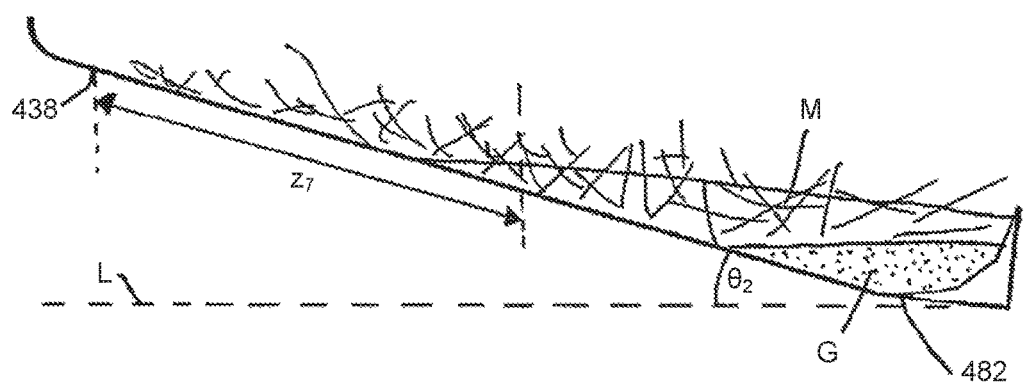
FIG. 11 is a schematic sectional view of the return pan of FIG. 10 taken along the line XI-XI and showing the vertical stratification of grain and MOG.
Figure 9:
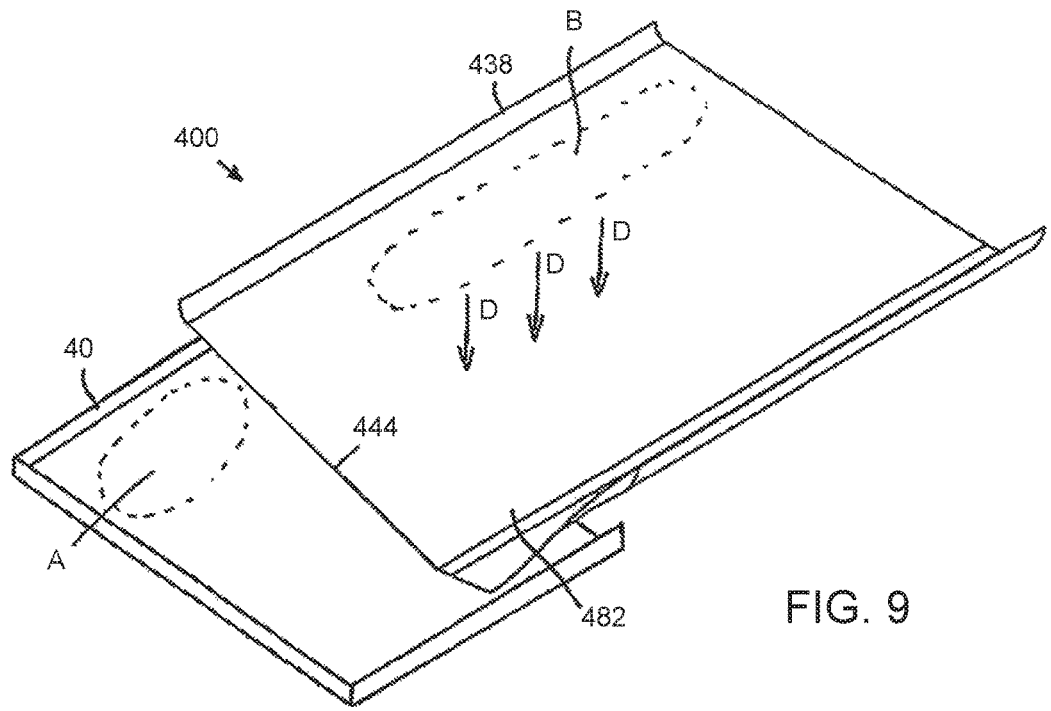
FIG. 9 is a schematic perspective view of a return pan in a combine harvester in accordance with a fourth embodiment of the invention.
Figure 10:
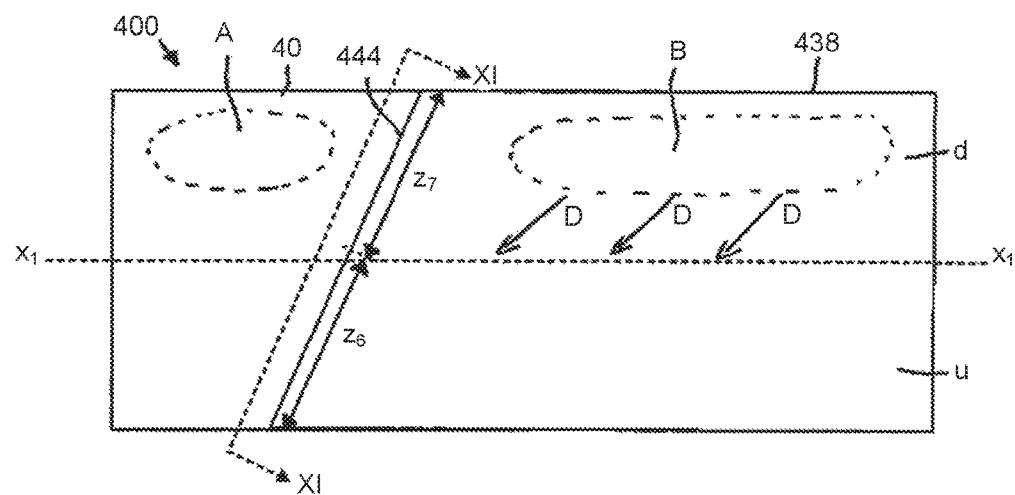
FIG. 10 is a schematic plan view of the crop material conveyance system of FIG. 9.

A fourth embodiment is depicted in FIGS. 9, 10 and 11. A single rotor, axial-flow, grain separating apparatus similar to that shown in FIG. 4 has a central longitudinal rotation axis X1 shown in FIG. 10 and which defines a down turning side D and an upturning side U. (The separating apparatus is omitted from FIGS. 9,10 and 11 for reasons of clarity.) As has been mentioned above, a significant proportion of the grain and MOG discharged by the separating apparatus falls from the downturning side D. Furthermore, a higher proportion of the material volume falls from the front of the separating apparatus than the rear. With reference to FIGS. 9 and 10, a significant proportion of the grain falls from the front end of the downturning side directly onto zone 'A' of stratification pan 40.

Return pan 438 has a front discharge edge 444 which is angled with respect to a transverse vertical plane so as to provide a forward edge zone $z_6$ and a rearward edge zone $z_7$. As best seen in FIG. 10, the forward edge zone $z_6$ resides under the upturning side u of the separating apparatus whereas the rearward edge zone $z_7$ resides under the downturning side d. (This is in contrast to the embodiment of FIG. 3 involving a planar return pan).

A significant proportion of the floor of return pan 438 is transversely or laterally inclined so as to form a lateral angle $\theta_2$ with the horizontal, represented by dashed line L in FIG. 11. In the embodiment shown the entire length of the floor of return pan 438 is transversely inclined. However, in alternative embodiments only portions of the floor are inclined.

Grain and MOG incident on the downturning side d of return pan 438 is guided sideways and forwardly by the slope of the return pan 438 and the oscillating motion thereof towards a trough 482 residing on the upturning side u. This is represented in FIGS. 9 and 10 by zone 'B' and by arrows D.

Trough 482 is aligned fore and aft and guides grain and MOG to the forward edge zone $z_6$ on the upturning side u. Advantageously, the grain and MOG collected by the return pan 438, the majority of which is collected on the downturning side d, is shifted laterally by the sloping return pan 438 to the upturning side u thus laterally balancing the volume of separated material on the stratification pan 40, and ultimately in the cleaning shoe 42.

The transit of grain and MOG across the floor of stratification pan 438 leads to some degree of vertical stratification with the heavier grain sinking to the floor whilst the lighter MOG rises to the top. The stratification of grain and MOG on the return pan 438 is enhanced by the provision of trough 482 wherein, as shown in FIG. 11, grain G comes to reside in the bottom of the trough 482 with MOG M resting on top. Due to the transverse inclination $\theta_2$ a lateral spreading of the MOG-rich upper layers occurs as shown in FIG. 11.

The grain-rich lower layer is discharged from the forward edge zone $z_6$ whereas only MOG is discharged from the rearward edge zone $z_7$. Due to the transversely angled discharge edge 444 the grain G is deposited further forward on the stratification pan 40. The MOG-rich material falling from the rearward edge zone $z_7$ falls on top of the grain that was incident on zone A and has settled on the pan. As a result the stratification of grain and MOG on stratification pan 40 is enhanced.

Figure 5:
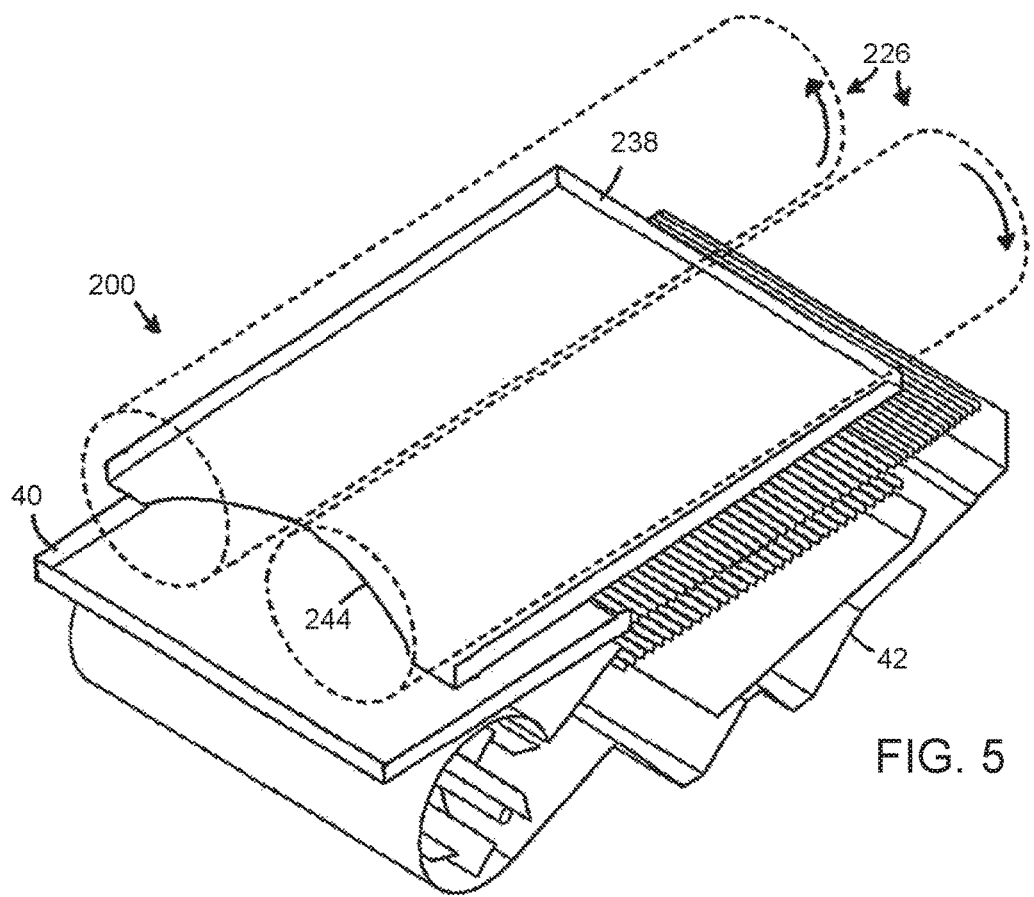
FIG. 5 is a schematic perspective view of a crop material conveyance system in a combine harvester in accordance with a second embodiment of the invention.
Figure 6:
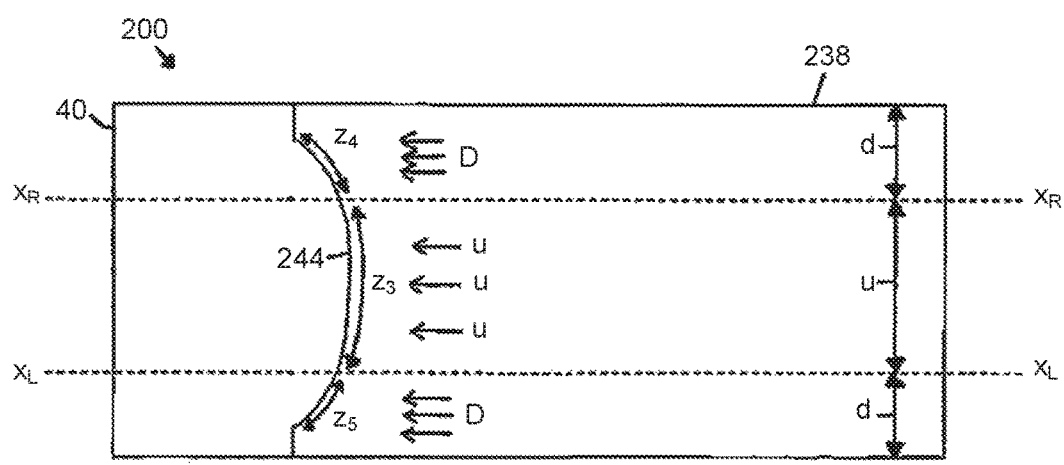
FIG. 6 is a schematic plan view of the crop material conveyance system of FIG. 5.
Figure 12:
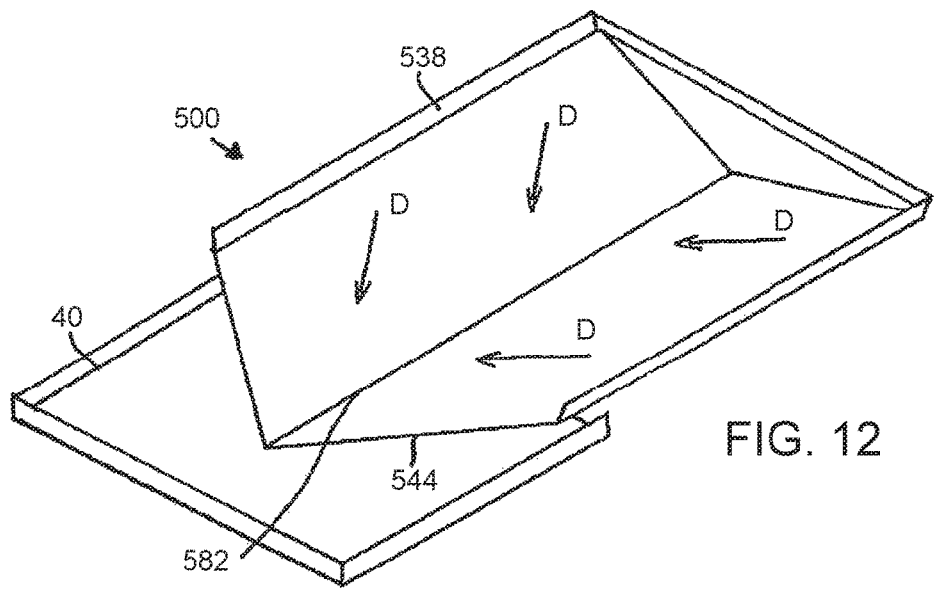
FIG. 12 is a schematic perspective view of a crop material conveyance system in a combine harvester in accordance with a fifth embodiment of the invention.
Figure 13:
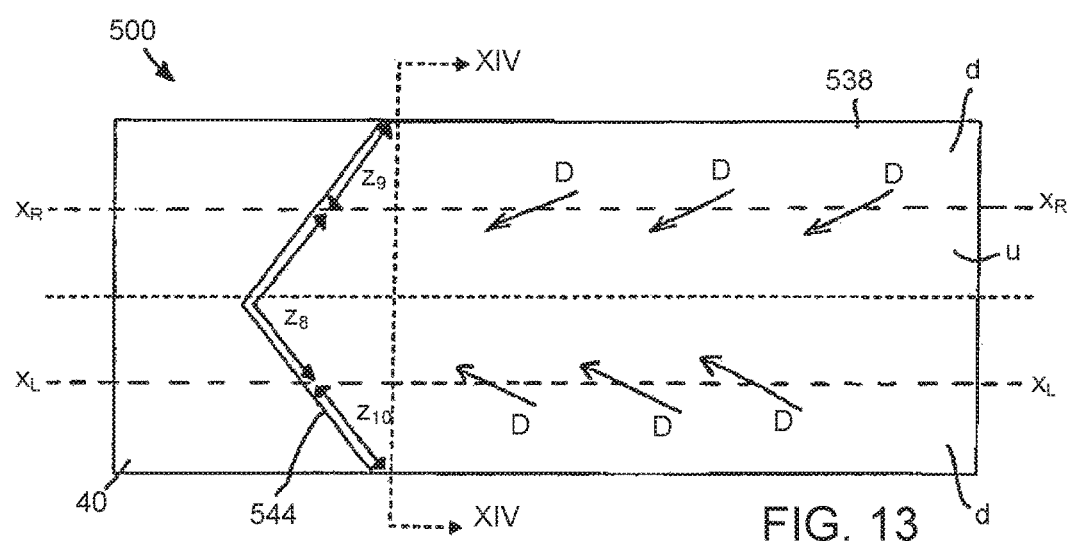
FIG. 13 is a schematic plan view of the crop material conveyance system of FIG. 12.

In a fifth embodiment (FIGS. 12, 13 and 14) the previous embodiment is adapted for use under a twin-rotor, axial-flow, grain separating apparatus similar to that shown in FIG. 5 but omitted from the drawings in this case for reason of clarity. The two grain separating rotary processors have rotation axes indicated as $X_R$ and $X_L$ and are located above material conveyance system 500 which comprises a return pan 538 and stratification pan 40. The rotation axes $X_R$, $X_L$ together define a central zone u extending longitudinally and corresponding with the upturning sides of the rotary processors, and a pair of outer zones d extending longitudinally and corresponding to the respective downturning sides of the rotors.

The floor of return pan 538 slopes away transversely from the outer zones d and towards a central longitudinal trough 582. A significant proportion of the grain and MOG falls onto outer zones d from where the material is conveyed forwardly and inwardly towards the trough 582 as indicated by arrows D. As in the previous embodiment, the grain G and MOG M stratify as the material is conveyed across the return pan 538.

Figure 14:
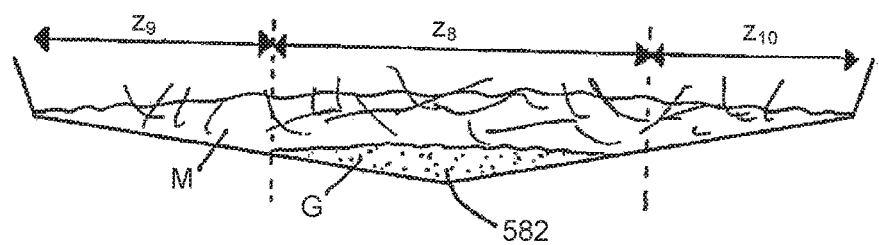
FIG. 14 is a schematic sectional view of the return pan of FIG. 13 taken along the line XIV-XIV and showing the vertical stratification of grain and MOG.

FIG. 14 shows the grain-rich material G residing in the base of trough 582 whilst the MOG M sits on top thereof. Due to the laterally-inclined floor the MOG layer M is laterally stretched leaving the grain focused towards the transverse centre.

Front discharge edge 544 of return pan 538 has a V-shaped protruding profile with a central forward edge zone $z_8$ flanked by rearward edges $z_9$, $z_{10}$. As in the previous embodiment, forward edge zone $z_8$ resides under the upturning sides u of the separating rotors whereas the outer rearward edge zones $z_9$, $z_{10}$ each reside under a respective downturning side d. This is in contrast to the return pan located under a twin-rotor processor of the second embodiment shown in FIG. 6.

The transverse extent of the respective edge zones $z_8$, $z_9$, $z_{10}$ are super-imposed on FIG. 14. It can be seen that the majority of the grain G falls from the forward edge zone $z_8$ which is more forward on the stratification pan 40 than the MOG M falling from rearward edge zones $z_9$, $z_{10}$. Advantageously, the grain G collected by return pan 538 is disposed towards the front of the stratification pan 40 thereby increasing the transit path thereof and thus the opportunity to stratify upstream of the cleaning shoe 42.

The laterally spread MOG M falling from the rearward edge zones $z_9$, $z_{10}$ falls onto a rearward zone of the stratification pan 40 thus on top of grain already settled on the pan. In addition to the advantageous longitudinal spread of material on the stratification pan 40, the lateral incline of the return pan 538 deposits the grain G on to a transverse central zone of the stratification pan thus providing a more balanced load thereon.

Figure 15:
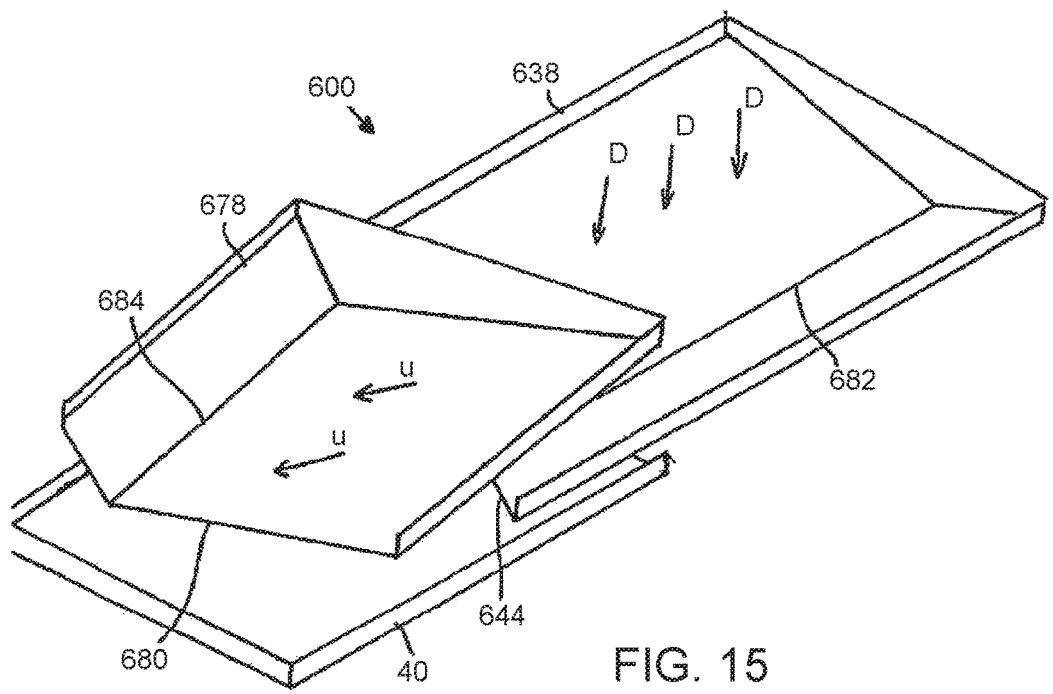
FIG. 15 is a schematic perspective view of a crop material conveyance system in a combine harvester in accordance with a sixth embodiment of the invention.

In a sixth embodiment (FIGS. 15 and 16) a material conveyance system 600 comprises a stratification pan 40 and a dual return pan system having a rear return pan 638 and front return pan 678. Both the front and rear return pans 678, 638 have transversely-inclined floor portions which steer the collected grain and MOG sideways into a respective trough 682,684.

The material conveyance system 600 in accordance with a sixth embodiment is configured to be used under a single-rotor axial flow grain processor having a rotation axis $X_1$. The floor of front return pan 678 slopes transversely downwardly to the downturning side d of the rotor whilst the floor of the rear return pan 638 slopes transversely downwardly to the upturning side u of the processing rotor.

Front return pan 678 has a transversely angled discharge edge 680 having a forward edge zone $z_{11}$ on the downturning side d and rearward edge zone $z_{12}$ on the upturning side u. Grain and MOG caught by the front return pan 678 is guided laterally to the forward edge zone $z_{11}$. Vertical stratification of the grain MOG thereon and the consequential lateral spreading of the grain and MOG layers occurs on front return pan 678 in a similar manner to that of the embodiments described above.

The design of the rear return pan 638 can be considered a mirror image of the front return pan 678 wherein material caught thereby is laterally steered into trough 682 disposed on the upturning side u and leading to a portion discharge edge 644 that is displaced forwardly of the portion on the downturning side d. The movement of material on rear return pan 638 is indicated by arrows D.

The opposite transverse inclination of the floors of front and rear return pan 678, 638 improves the transverse distribution of crop material in terms of load on the stratification pan 40 whilst also exploiting the advantages of a dual return pan system.

Figure 16:
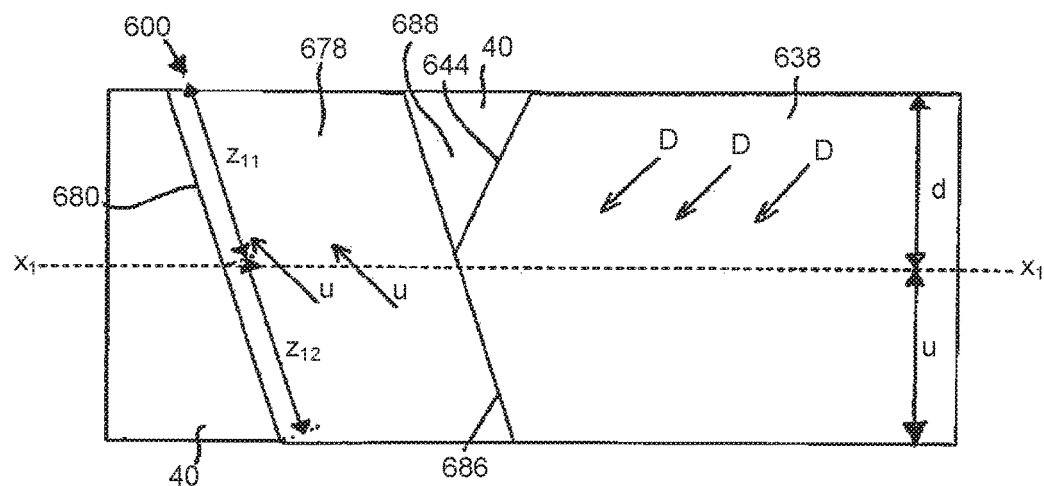
FIG. 16 is a schematic plan view of the crop material conveyance system of FIG. 15.

It should be noted from FIG. 16 that the rear edge 686 of front stratification pan 678 is also transversely angled in the same direction as that of the front edge 680. When viewed from above a gap 688 exists between the rear edge 686 of the front return pan 678 and the front edge 644 of rear return pan 638. This gap permits material to fall directly from the processing rotor overhead directly on to the stratification pan 40.

Figure 17:
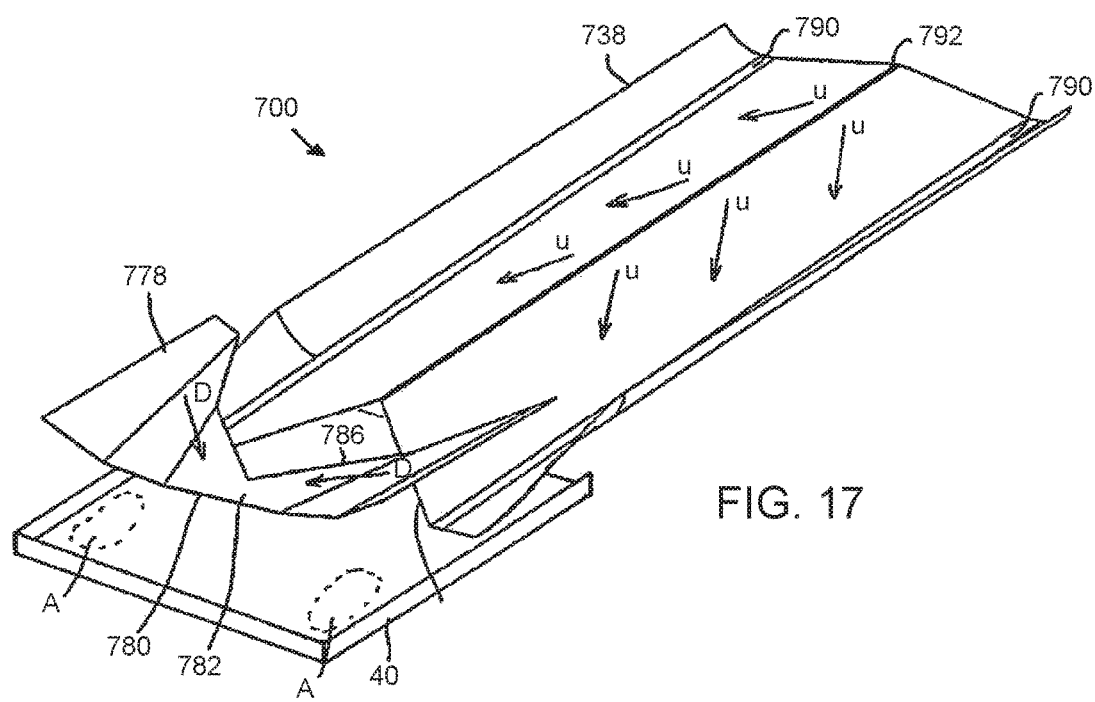
FIG. 17 is a schematic perspective view of a crop material conveyance system in a combine harvester in accordance with a seventh embodiment of the invention.
Figure 18:
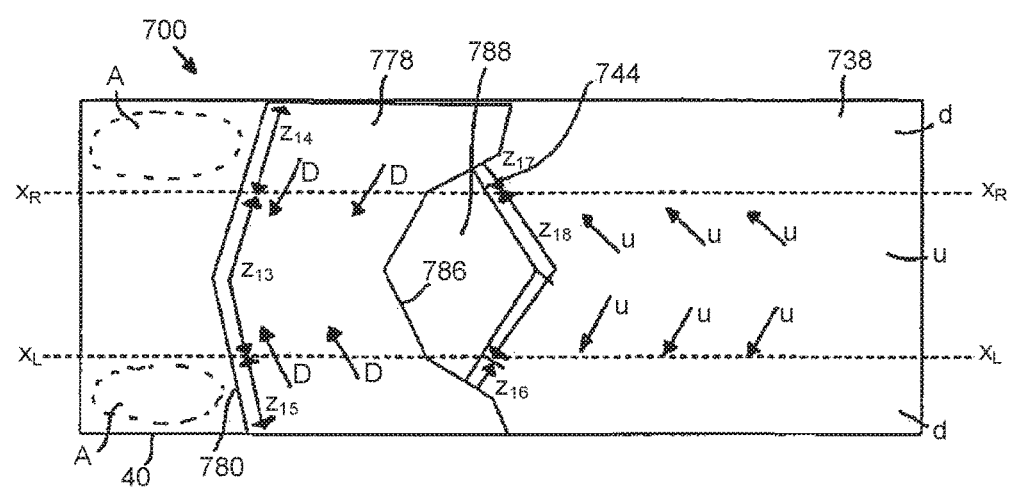
FIG. 18 is a schematic plan view of the crop material conveyance system of FIG. 17.

In a seventh embodiment (FIGS. 17 and 18) a material conveyance system 700 is adapted to cater for a twin-rotor, axial flow, grain separating processor and comprises a stratification pan 40 and a dual return pan system having a front return pan 778 and a rear return pan 738.

The front return pan 778 has a floor which is transversely inclined downwardly towards a central zone, or trough, 782 which resides under the upturning sides of the overhead rotors and corresponds to a central longitudinal zone u. The front discharge edge 780 comprises a central forward edge zone $z_{13}$ flanked by rearward edge zones $z_{14}$, $z_{15}$.

Although shown as having a V-shaped profile, the discharge edge 780 may take on many alternative forms including a stepped profile or a curved profile by way of example.

Forward edge zone $z_{13}$ corresponds to the zone u whereas the rearward edge zones $z_{14}$, $z_{15}$ reside under respective downturning sides d. The central longitudinal trough 782 guides the collected grain and MOG to the forward edge zone $z_{13}$ which deposits such material towards the front of the stratification pan 40 in the centre thereof. The rearward offset of the outer portions $z_{14}$, $z_{15}$ of discharge edge 780 allows a significant proportion of grain to fall directly from the separating rotors above onto zones 'A' of the stratification pan 40.

Advantageously, the front return pan 778 serves to balance the volume of material on the stratification pan by depositing the majority of the collected grain onto the central portion between zones A. Any material discharged from rearward edge zones $z_{14}$, $z_{15}$ is rich in MOG and is thus deposited on top of the already-settled grain on stratification pan 40.

Rear return pan 738 comprises sloping floor portions which are inclined transversely and downwardly towards a pair of troughs 790 disclosed below the downward turning sides d. A central longitudinal crest 792 is also provided in the profile of the floor of rear return pan 738. Grain and MOG collected by the rear return pan 738 is steered laterally outwardly into troughs 790 all the while stratifying wherein the grain comes to rest in the base of the troughs 790 and the MOG rises to the top and spreads laterally outwardly due to the lateral slope of the floor. The front discharge edge 744 of rear return pan 738 comprises outer forward edge zones $z_{16}$, $z_{17}$ disposed either side of a central rearward edge zone $z_{18}$ together forming an inward V-shaped profile. The grain collecting in the trough 790 is therefore deposited onto the underlying stratification pan 40 further forward than the MOG which is discharged by the rearward edge zone $z_{18}$ thus enhancing stratification on the stratification pan 40.

The rear edge 786 of front return pan 778 has a cut-out section or rather has a concave-shaped profile which reveals a gap 788 when viewed from above. Advantageously, the gap 788 enlarges the window through which material can pass from the discharge edge 744 of the rear return pan 738 thereby reducing the risk of blockage.

Figure 19:
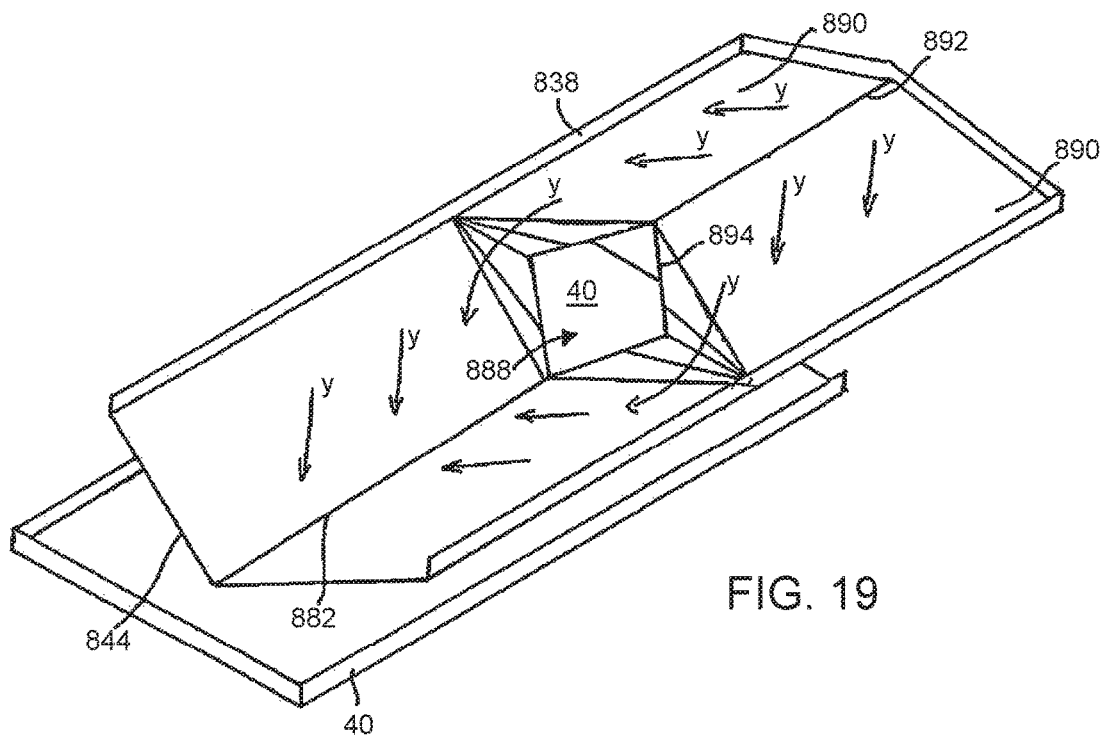
FIG. 19 is a schematic perspective view of a crop material conveyance system in a combine harvester in accordance with a eighth embodiment of the invention; and, FIG. 20 is a schematic plan view of the crop material conveyance system of FIG. 19.
Figure 20:
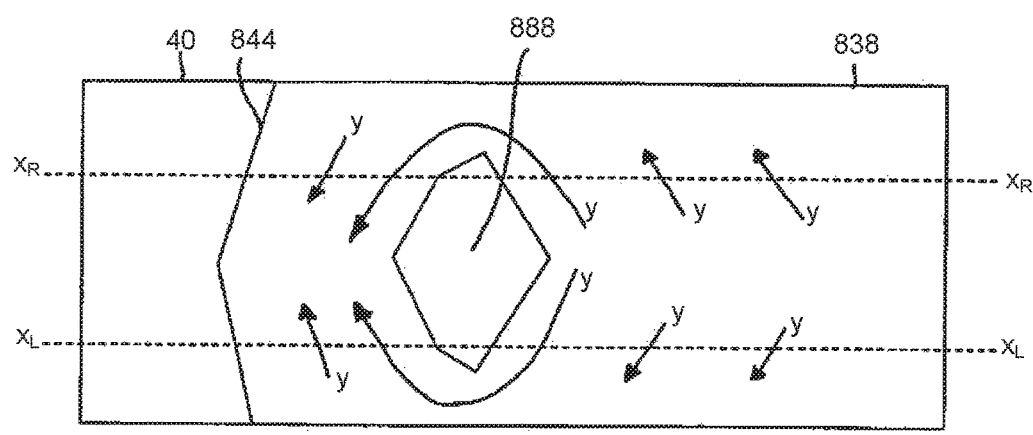

In an eighth embodiment (FIGS. 19 and 20) the dual return pan system described above is configured as a single unitary return pan 838 for use under a twin-rotor axial flow grain separating apparatus having rotation axes $X_R, X_L$. The return pan 838 comprises a rear portion having a longitudinal central crest 892 and outwardly-inclined floor portions leading to troughs 890, and a front portion having a longitudinal central trough 882 and inwardly-sloping floor portions. An opening 888 is formed in the floor of return pan 838 between the rear portion and the front portion. The opening 888 defines a secondary discharge edge 894 from which material collected on the rear portion of the return pan 838 can be discharged onto the underlying stratification pan 40.

Grain and MOG incident on the rear portion of return pan 838 is steered laterally outwardly away from the crest 892 and towards troughs 890. The troughs 890 guide the majority of the grain around the opening 888 onto the front portion of return pan 838. Due to the lateral spread of MOG on top of the grain, a portion of the MOG is caused to fall through the opening 888 onto a rear portion of the underlying stratification pan 40. The secondary discharge edge 894 has an inward V-shaped profile as per the discharge edge 744 of the previous embodiment for the same reasons.

Grain and MOG incident on the front portion of return pan 838, together with grain and MOG conveyed around the opening 888, is steered laterally inwardly towards central trough 882 as shown by arrows Y. Front discharge edge 444 has a positive V-shaped profile similar to that of discharge edge 780 of the previous embodiment for the same reasons.

In summary, there is provided a combine harvester with a conveyance system for transporting crop material discharged by overhead grain separating apparatus to a grain cleaning shoe. The conveyance system comprises a series of oscillating pans which move the grain in a generally longitudinal direction. A return pan conveys the collected material forwardly to a front discharge edge from where the material falls onto a stratification pan below. The stratification pan conveys the collected material rearwardly to a rear discharge edge from where the material falls into the grain cleaning shoe. At least one of the return pan and the stratification pan is non-rectangular and has a non-transverse discharge edge.

It should be emphasized that the above-described embodiments of the present disclosure are merely possible examples of implementation, merely set forth for a clear understanding of the principles of the disclosure. Many variations and modifications may be made to the above-described embodiments of the disclosure without departing substantially from the spirit and principles of the disclosure.

The invention claimed is:

1. A crop material conveyance pan for a combine harvester, the pan comprising:
    a first return pan; and
    a second return pan;
    wherein at least one of the first return pan the second return pan comprises a transversely inclined non-rectangular major surface;
    wherein the non-rectangular major surface is bounded by three edges having a material-retaining profile;
    wherein the non-rectangular major surface is bounded by a crop discharge edge at least a portion of which is non-orthogonal with respect to adjacent edges of the non-rectangular major surface; and
    wherein a gap exists, when viewed from above, between a portion of the rear edge of the first return pan and the discharge edge of the second return pan.

2. A combine harvester having a normal forward direction of travel which defines a longitudinal and a transverse direction, the harvester comprising a crop material conveyance pan, the pan being coupled to a drive mechanism for driving the pan in an oscillating manner, wherein the pan comprises first and second return pans, wherein at least one of the first return pan and the second return pan comprises a transversely inclined floor portion, wherein at least one of the first return pan and the second return pan has a discharge edge which is disposed at a non-zero angle to a transverse vertical plane, and wherein a gap exists, when viewed from above, between a portion of the rear edge of the first return pan and the discharge edge of the second return pan, wherein separated crop material can fall through the gap.

3. The combine harvester according to claim 2, comprising a grain separating apparatus, wherein said crop material conveyance pan is positioned under the grain separating apparatus and serves to catch crop material separated by the grain separating apparatus and convey collected material in a generally forward direction to the discharge edge.

4. The combine harvester according to claim 3, wherein the grain separating apparatus comprises an axial-flow crop processing rotor having a rotation axis which is aligned fore and aft, the rotor having a downturning side and an upturning side.

5. The combine harvester according to claim 4, wherein the grain separating apparatus comprises a pair of axial-flow crop processing rotors having respective rotation axes which are aligned fore and aft and mutually side-by-side, and wherein each rotor has a downturning side and an upturning side.

6. The combine harvester according to claim 5, wherein the pair of axial-flow crop processing rotors are driven to rotate in opposite directions defining transversely inner upturning sides and outer downturning sides.

7. The combine harvester according to claim 3, wherein at least one of the first return pan and the second the return pan comprises a contoured floor portion which guides crop material sideways to a trough, and wherein the discharge edge comprises a forward edge zone and a rearward edge zone disposed rearward of the forward edge zone, and wherein the trough guides crop material to the forward edge zone.

8. The combine harvester according to claim 7, wherein at least one of the first return pan and the second the return pan comprises a central longitudinal trough, and the discharge edge comprises a rearward edge zone on both sides of a central forward edge zone.

9. The combine harvester according to claim 8, wherein the floor of the at least one of the first return pan and the second return pan comprises an opening which defines a secondary discharge edge.

10. The combine harvester according to claim 9, wherein the floor defines a material guidance trough configured to guide crop material around the secondary discharge edge.

11. The combine harvester according to claim 2, wherein the grain separating apparatus comprises a pair of axial-flow crop processing rotors having respective rotation axes which are aligned fore and aft and mutually side-by-side, and wherein each rotor has a downturning side and an upturning side, wherein the first return pan is positioned under a front portion of the grain separating apparatus and the second return pan is positioned under a rear portion of the grain separating apparatus, wherein the first return pan comprises sloping floor portions which are each inclined transversely and downwardly towards a zone below the upturning side of the rotors, and wherein the second return pan comprises sloping floor portions which are each inclined transversely and downwardly towards a zone below the downturning sides of the rotors.

12. The combine harvester according to claim 11, wherein the floor of the first return pan comprises a central longitudinal trough, and wherein the floor of the second return pan comprises a central longitudinal crest.

13. The combine harvester according to claim 2, wherein the first return pan has a non-transverse rear edge.

14. The combine harvester according to claim 3, wherein at least one of the first return pan and the second return pan is formed from moulded plastic.

15. A combine harvester having a normal forward direction of travel which defines a longitudinal and a transverse direction, the harvester comprising:
    a drive mechanism;
    a grain-separating apparatus;
    a crop material conveyance pan coupled to the drive mechanism for driving the crop material conveyance pan in an oscillating manner, the crop material conveyance pan comprising first and second return pans positioned under the grain separating apparatus, wherein:

the first and second return pans are longitudinally offset from one another;
at least one of the first and the second return pans has a non-transverse discharge edge;
each return pan is configured to catch crop material separated by the grain-separating apparatus and convey collected material in a generally forward direction to a respective discharge edge,
at least one of the first return pan and the second return pan comprises a transversely inclined floor portion; and
the first return pan has a non-transverse rear edge;
wherein a gap exists, when viewed from above, between a portion of the rear edge of the first return pan and the discharge edge of the second return pan, wherein separated crop material can fall through the gap.

* * * * *